United States Patent Office 3,361,003
Patented Jan. 2, 1968

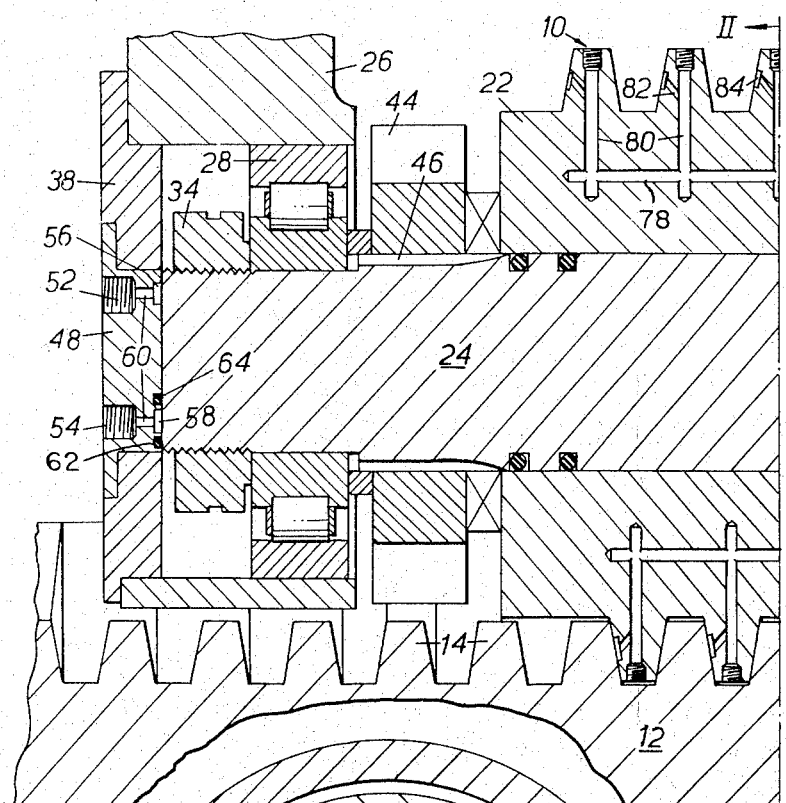
-FIG.1A.-
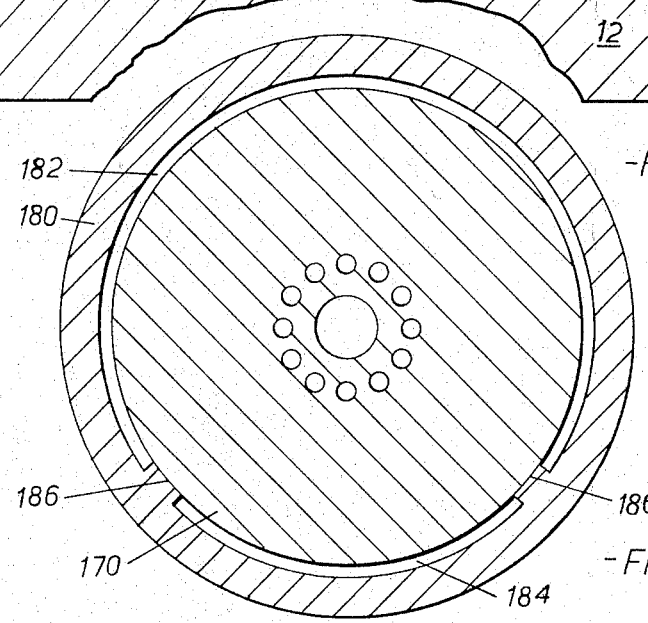
-FIG.5.-

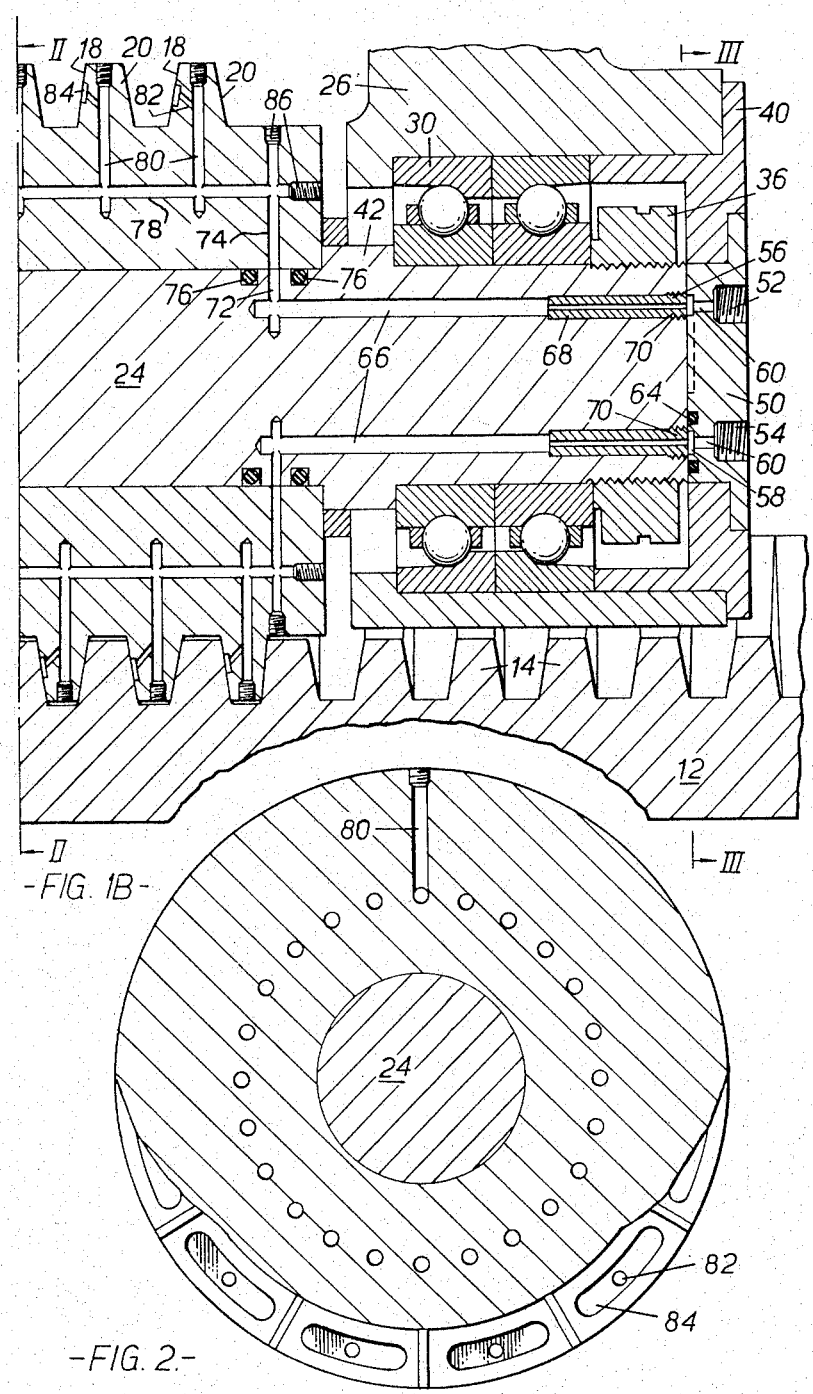

3,361,003
HYDROSTATICALLY LUBRICATED WORM AND RACK MECHANISM
Brian Hodgson, Sowerby Bridge, England, assignor to William Asquith Limited, Halifax, England, a corporation of Great Britain
Filed July 19, 1965, Ser. No. 472,882
Claims priority, application Great Britain, July 18, 1964, 29,397/64
8 Claims. (Cl. 74—424.6)

ABSTRACT OF THE DISCLOSURE

A worm and rack mechanism has means for supplying lubricant under pressure to those portions of the worm thread flanks lying between the teeth of the rack. The worm has a pluraltiy of axial passages formed in it, these being arranged in a circular formation, and a plurality of radial passages leads from each axial passage, there being outlet passages from the radial passages to the flanks of the threads. At the end of the worm, the axial passages are open and register successively with an arcuate port which supplies oil under pressure only to those passages which lead to parts of the thread flanks engaged by the rack teeth. There may be a second low pressure arcuate port to supply oil to the parts of the threads not engaged by the rack teeth.

---

Figure 3:
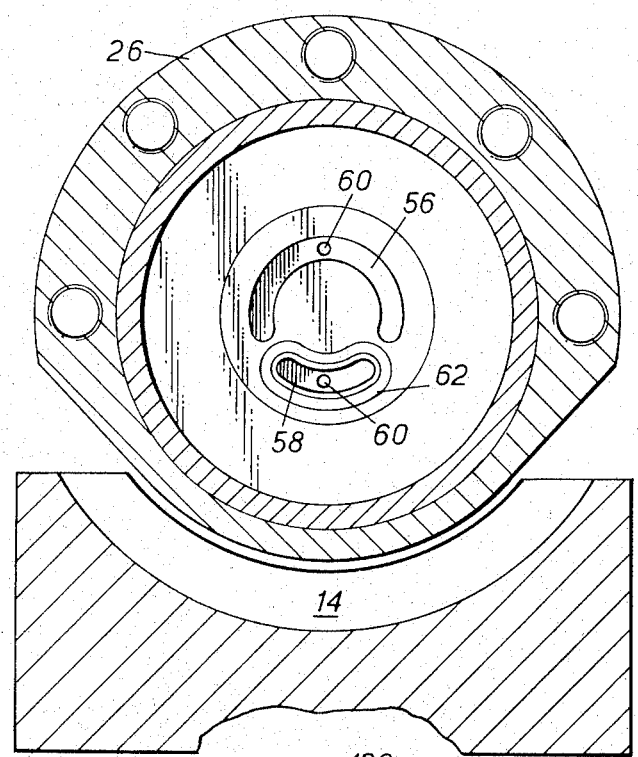

In many machine tools a slide or table has to be traversed or fed along guides on the machine bed. The conventional method for effecting such traverse or feed is to have a nut secured to the slide or table, the nut being engaged with a screw rotatably mounted on the machine bed. An alternative arrangement is to have a rotatable worm mounted on the slide or table, such worm engaging with a rack secured on the machine bed. the rack being arcuate in cross-section so as to partly embrace the worm. As is very important to minimise clearances between the teeth of the worm and rack, it has been proposed to provide hydrostatic lubrication, the lubricant being supplied under pressure to the worm which has outlets on opposite side faces of the teeth or thread of the worm, a restrictor being associated with each outlet so as to ensure that the lubricant in a supply conduit or chamber is always under pressure.

It will be appreciated that the outlet openings in that part of the worm that is not embraced by and in engagement with the rack will discharge lubricant ineffectively, and that the other outlet openings covered by the teeth of the rack will discharge lubricant under pressure into the gaps between the flanks of the worm thread and the rack teeth. When there is no axial load on the worm, the gaps on opposite flanks of the thread will be substantially equal, as the pressures of the lubricant in these gaps must be equal. However, when an axial load is applied, the gaps on one side of each thread will be reduced with corresponding increase in the gaps on the other side. This will cause a pressure differential in the gaps on opposite flanks of the worm thread until this is sufficient to withstand the load. With this form of hydrostatic lubrication, it is possible to have these changes in the gaps as small as ±0.0005 inch, so that besides minimising wear, this also minimises backlash to provide a stiff final drive between the slide and the bed in a machine tool, for example.

The present invention is concerned with the supply of lubricant to the worm of a worm and rack mechanism, which whilst primarily intended for the slide of a machine tool, could equally well be adapted for other purposes.

According to the invention in a worm and rack mechanism having lubricant passages leading to outlet openings in opposite flanks of the worm thread, means are provided for supplying lubricant at high pressure, only to those outlet openings in the parts of the thread that are in engagement with the rack. Outlet openings in parts of the thread not in engagement with the rack may be supplied with lubricant at a lower pressure sufficient to maintain the outlet openings and associated passages clear and prevent ingress of foreign matter. By high pressure, is meant a pressure sufficiently high to form a lubricant film in the gaps between the flanks of the worm teeth and the rack when the mechanism is under load. In this way, as high pressure lubricant will not be discharged through the outlet openings clear of the rack, there will be a considerable reduction in power required to supply lubricant to the worm.

For supplying lubricant to the outlet openings, there may be an annular series of axially disposed passages in the worm shaft, the outer end of each passage being open at one end of the shaft and each passage being connected with all the outlet openings disposed in the same angular position around the worm axis. Means are provided for connecting the outer ends of the axial passages with a source of lubricant under pressure, the said means being stationary so that as the worm shaft rotates, the passages will be connected in succession the lubricant supply only when the corersponding outlets are covered by the teeth of the rack. For this purpose, a stationary port plate may be mounted at the said end of the wormshaft so as to cover the outer ends of the axial passages. A high pressure supply port through the port plate communicates with an arcuate groove in the side of the plate abutting the end of the wormshaft, the other end of the high pressure supply port being adapted for connection to a source of lubricant under high pressure. The length of the arcuate groove is such that as the wormshaft rotates relatively to the port plate, the outer end of each axial passage will register with the arcuate groove during that part of rotation when the corresponding outlet openings are covered by the rack teeth. The port plate has a second or low pressure port communicating with a second or low pressure arcuate groove in the face of the port plate and adapted for connection to a source of lubricant under low pressure. This low pressure arcuate groove is so disposed and of such length that as the wormshaft is rotating, the outer end of each axial passage will register with the lower pressure groove during that part of rotation when the corresponding outlet openings are clear of the rack teeth. Consequently lubricant at high pressure will be supplied to the gaps between the flanks of the worm thread and the rack teeth, and lubricant at low pressure will be supplied to the outlet openings that are clear of the rack teeth. A restrictor may be mounted in the outer end portion of each axial passage so as to serve for all the outlets common to each passage.

In an alternative arrangement, the port plate is in the form of a disc secured to the end of the wormshaft so as to rotate therewith. The port plate has a series of radially disposed passages, the inner end of each passage communicating with one of the passages of the wormshaft, and the outer ends of the radial passages opening in the outer cylindrical surface of the disc. A restrictor is disposed in each radial passage so as to serve for all the outlet openings of the corresponding wormshaft passage. The port plate is a close fit in a shallow cylindrical chamber of a stationary housing the cylindrical surface of the chamber having two grooves with which the open ends of the radial passages will register in succession as the port plate rotates with the wormshaft. A high pressure port in the housing is adapted to be connected to a source of lubricant under high pressure and leads into one of the grooves, the high pressure groove which extends around the chamber to such extent that each radial passage will be in register therewith during the time that the corresponding outlet openings are covered by the teeth of the rack so as to supply high pressure lubricant to the gaps between the flanks of the worm thread and the rack teeth. The other groove, the lower pressure groove, extends substantially around the remainder of the chamber to supply low pressure lubricant to the radial passages leading to the outlet openings in the worm thread clear of the rack teeth. It is preferred that the low pressure groove should be wider than the high pressure groove so as to hydraulically balance the port plate. Lubricant at low pressure may be fed to the low pressure groove in a manner similar to that for the high pressure groove. Alternatively, the clearance between the port plate and the chamber may be such, for example, approximately 0.002 inch, as to allow lubricant to pass through the said clearance gap from the high pressure groove to the low pressure groove, the said clearance gap restricting the flow so that the pressure will be substantially less than that in the high pressure groove.

In each of the arrangements described, the power required to supply the lubricant is minimised as high pressure lubricant is only supplied to those parts of the worm thread that are in engagement with the rack. Furthermore, each restrictor serves for a series of outlet openings and the restrictors are so positioned as to be more readily accessible than if they were disposed in the branches of the passages leading to individual outlet openings.

Figure 4:
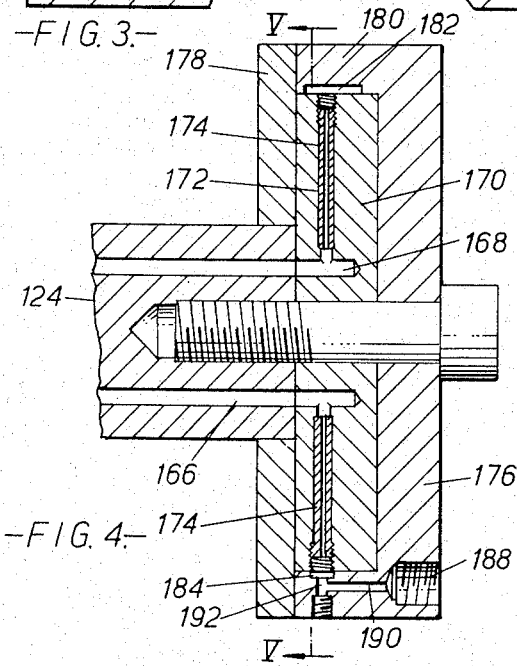

Two constructions in accordance with the invention will now be described, by way of example only, with reference to the accompanying drawings, in which:

FIGURES 1A and 1B together show a longitudinal section through a worm and rack mechanism for driving part of a machine tool, FIGURE 2 is a cross-section on the line II—II in FIGURE 1, FIGURE 3 is a cross-section in the line III—III in FIGURE 1, FIGURE 4 is a detail sectional view of an alternative arrangement for controlling the fluid feed.

FIGURE 5 is a cross-section on the line V—V in FIGURE 4, and

Figure 6A:
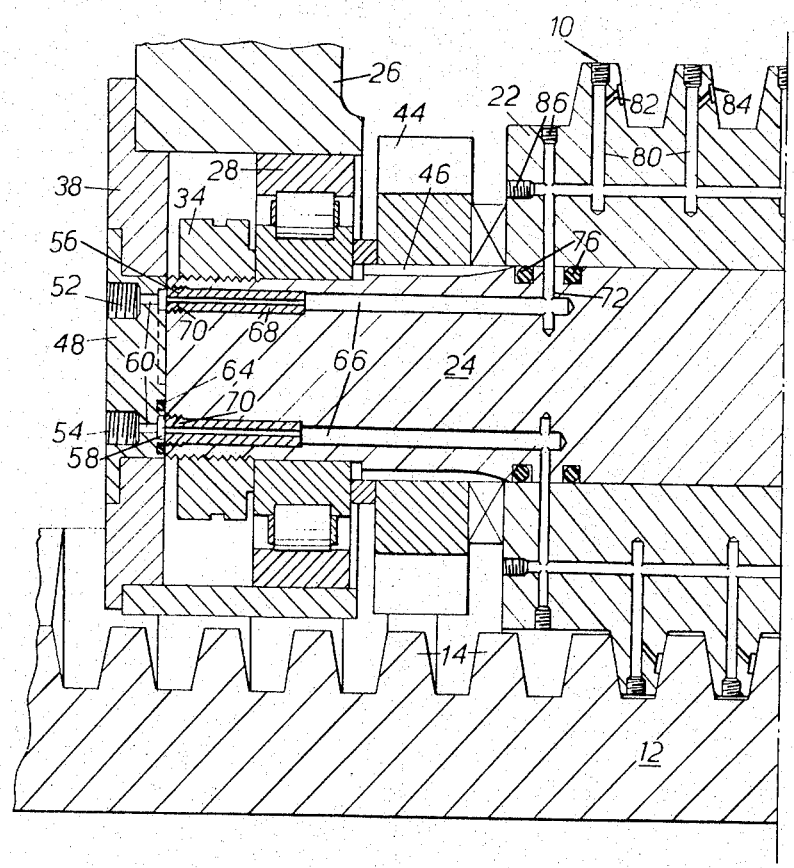
Figure 6B:
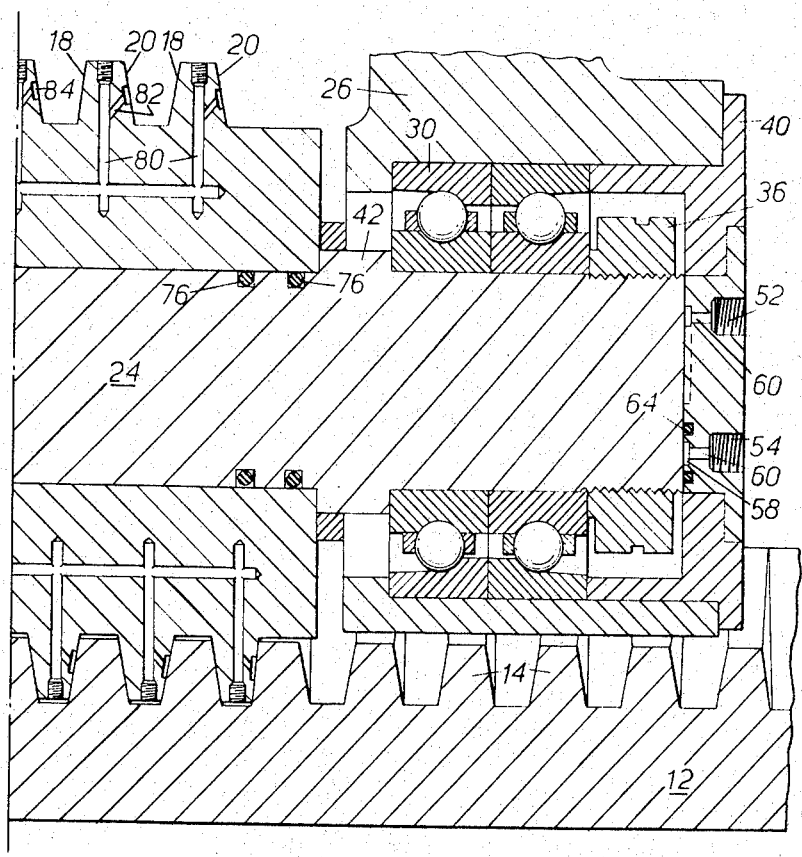

FIGURES 6A and 6B together show a longitudinal section similar to FIGURES 1A and 1B, but taken in a different radial plane.

Referring to FIGURES 1 to 3 and 6 of the drawings, there is illustrated a mechanism for driving the slide of a machine tool (although it will be appreciated that the mechanism could be applied to other machines wherein a rectilinear motion is required). Essentially, the mechanism comprises a worm 10 having engagement with a rack 12. The rack 12 is fixed to part of the fixed bed of the machine tool (not shown) and it will be noted from FIGURE 3 that the rack teeth 14 are cut after the fashion of wormwheel teeth so that each rack tooth subtends an arc about the longitudinal axis of rotation of the worm 10. In this particular example the worm thread 16 has straight sided flanks 18 and 20 for engagement with the teeth 14 of the rack, but it should be understood that other tooth forms (e.g. involute helicoidal) could be used.

The worm thread 16 is out in a worm cylinder 22 which is fixed on a wormshaft 24 journalled in a carriage 26 which is required to slide endwise on the bed of the machine tool, there being a plain roller journal bearing 28 at the left hand end, as seen in FIGURE 1, and two opposed dual purpose journal and thrust bearings 30 and 32 at the right hand end. The inner races of the bearings are locked endwise on the wormshaft by nuts 34 and 36 and there are end covers 38 and 40 secured to the carriage 26. The arrangement is such that end thrust on the shaft 24 in one direction is transmitted via a collar 42 on the shaft the bearings 30 and 32 and the end cover 40 to the carriage 26, whereas end thrust in the opposite direction is transmitted via the nut 36, and the bearings 30 and 32 to the carriage 26. A spur gear wheel 44 is fitted on to a splined portion 46 of the shaft 24, so that driving torque can be transmitted to the worm through the wheel 44 and the wormshaft 24. When the worm is rotated in one direction, the carriage is caused to move endwise to the left as seen in FIGURE 1, whereas when the worm is rotated in the opposite direction, the carriage is caused to move to the right.

In order to ensure efficient working of the mechanism, and to minimise the effect of backlash in the worm and rack gearing, provision is made for hydrostatic lubrication of the gearing.

Stationary port plates 48 and 50 are respectively carried by the end covers 38 and 40, each of these plates being formed with internally screwed holes 52 and 54 to receive glands (not shown) on oil feed pipes (not shown). On their inside faces, each of the port plates has two arcuate recesses or elongated ports 56 and 58 which communicate via small bore ports 60 with the screwed holes 52 and 54. The oil supply to the two ports 56 and 58 through the feed pipes is arranged so that oil is supplied under relatively high pressure (of the order 750 pounds per square inch) to the lower port 58, but under relatively low pressure (say 50 pounds per square inch) to the upper port 56. An additional recess 62 is passed around the high pressure port 58, and a resilient sealing ring 64 is fitted into this recess to seal against the end of the wormshaft 24 (see FIGURE 1) to prevent escape of oil. It will be observed that the high pressure port 58 subtends substantially the same angle around the axis of the wormshaft as that of the rack teeth 14. This is an important feature of the invention as will appear.

A set of twelve axially directed holes 66 is formed in each end of the wormshaft 24 equally spaced in a circular arrangement. The axial holes in one end are angularly displaced relatively to those in the other end, so that only those at the right hand end are visible in FIGURE 1 while the holes in the left hand end are shown in FIGURE 6. Each of the holes 66 has a restrictor 68 fitted in its outer end; the restrictors shown in the drawings being simple capilliary tubes formed with screwed portions 70 by means of which they are secured in position. More sophisticated restrictors could be employed, but their only purpose is to create a back-pressure against return flow of oil through them.

The arrangement of the axial holes 66 is such that they are collectively in communication with the two ports 56 and 58 and as each hole 66 registers with the port 58 it will receive oil under high pressure, whereas when it registers with the port 56 it will receive oil under low pressure. Near its inner end, each hole 66 intersects a radial hole 72, and a corresponding radial hole 74 in the worm registers with the hole 72. Sealing rings 76 on each side of the radial holes 72 prevent leakage of oil between the shaft 24 and the cylinder 22. An axially directed hole 78 intersects each of the radial holes 74 in the wormshaft, and there are radial holes 80 formed through each convolution of the worm thread 16 into each of the twelve axial holes 78 in the worm cylinder. From each of the holes 80, a small-bore port 82 leads to an arcuate recess 84 (see also FIGURE 2) in the flank 18 of the worm thread 16. These recesses form oil pads for the hydrostatic lubrication of the thread. The open ends of the holes 74, 78 and 80 are blocked by plugs 86, so that oil entry through the ports 56 and 58 and the restrictors 68 can only pass through the various holes to the pads 84.

The arrangement of axial and radial holes in communication with the ports 56 and 58 at the left hand end of FIGURE 1 is a duplicate of that at the right hand end, excepting that the oil pads are in the flanks 20 of the thread 16 (see FIGURE 6).

In use, oil is ejected from the flanks of the worm thread through the pads 84. So long as the worm is not rotated the high pressure oil ejected from those pads which lie within the rack teeth 14 will form films of equal thickness on opposite sides of each convolution of the thread between the flanks 18 and 20 and the flanks of the rack teeth 14. When the worm is rotated to move the carriage to one side or the other the film of oil on the side of the worm thread which carries the load will be reduced in thickness causing increase of oil pressure on that side and decrease on the other side. When the pressure difference is sufficient to carry the load, the carriage begins to move. There is thus provided hydrostatic lubrication of the pressure carrying surfaces. However, in contradistinction to the known arrangement, oil under high pressure is only supplied to the pads 84 which are actually in the zone of "engagement" with the rack teeth 14. The low pressure oil which is supplied to the other pads simply pours out of the pads, and takes no part in the hydrostatic lubrication. Theoretically, the low pressure oil is not necessary, but in practice it is useful to keep the passages free from obstruction. It will be appreciated that by supplying low pressure oil to the zone not in "engagement" with the rack teeth, there is a considerable reduction in the power required to force the oil through the passageways, and there is also a saving in the quantity of oil required.

Referring now to FIGURES 4 and 5, there is illustrated the right hand end of a worm which apart from the ports shown in these two figures is identical with that shown in FIGURES 1 to 3. The wormshaft 124 has twelve axial holes 166, but each of these registers with a short axial hole 168 in a plate 170 which is fixed to the end of the shaft 124, so as to be rotatable therewith. Radial holes 172 formed in the rotatable plate 170 intersect the axial holes 168, and a restrictor 174 is positioned in each of these radial holes.

An end housing 176 is secured to a fixed part 178 of the carriage, an annular flange 180 on this housing extending around the outside of the plate 170. Two recesses 182 and 184 are formed in the flange 180, there being short lands 186 between them (see FIGURE 5). The recess 182 is a low pressure port whereas the recess 184 is a high pressure port, and the latter subtends substantially the same angle about the axis of rotation of the wormshaft as the teeth of the rack.

A screwed hole 188 is adapted to receive a gland on a high pressure oil supply pipe (not shown), and the hole 188 communicates with the high pressure port 184 through holes 190 and 192 (the latter being plugged at its outer end). It would be possible to provide for a similar supply from a low pressure oil pipe to the low pressure port 184, but it has been found possible to obtain the required low pressure by leakage from the high pressure port 184 over the lands 186 into the low pressure port. In order to avoid extra unbalanced load on the housing 176, the low pressure port is wider than the high pressure port. The hydrostatic loading of the worm functions exactly as in the previously described arrangement, the only difference between the two being the manner in which the oil supply ports are arranged.

I claim:

1. A worm for use in a worm and rack mechanism, said worm having a plurality of axial passages formed therein, said passages being open at one end of said worm, a plurality of radial passages formed in the thread of said worm, a plurality of said radial passages intersecting each of said axial passages, and outlet ports formed in said thread, each of said outlet ports communicating with one of said radial passages at its inner end and being open at its outer end, and means supplying lubricant under high pressure selectively to those of said axial passages which are in communication via said radial passages and said outlet ports with areas of said thread in engagement with the teeth of said rack.

2. In a worm and rack mechanism as claimed in claim 1, means supplying lubricant under lower pressure than said high pressure selectively to the remainder of said axial passages.

3. A worm as claimed in claim 1, comprising two sets of axial passages one set open at each end of said worm, said outlet ports which communicate with one set of said axial passages opening on to one flank of said thread and said outlet ports which communicate with the other set of said axial passages opening on to the other flank of said thread.

4. A worm as claimed in claim 3, wherein each flank of said thread is formed with a plurality of arcuate recesses, curved about the axis of rotation of said worm, each of said ports communicating with one of said arcuate recesses.

5. A worm and rack mechanism comprising a worm having a thread, means mounting said worm for rotation about its own longitudinal axis, a rack formed with teeth, said thread of said worm engaging some of the teeth of said rack, said worm providing a plurality of axial passages open at one end of said worm said plurality of axial passages being arranged in a circular arrangement around said longitudinal axis, a port plate engaging said one end of said worm and defining an arcuate port curved about said longitudinal axis said arcuate port communicating with a source of high pressure lubricant, the radius of curvature of said arcuate port being such that the ends of said axial passages register with said arcuate port successively as said worm is rotated, said arcuate port subtending substantially the same angle about said longitudinal axis as said teeth of said rack, each of said axial passages communicating with a plurality of outlets in one flank of said thread.

6. A worm and rack mechanism comprising a worm having a thread, means mounting said worm for rotation about its own longitudinal axis, a rack formed with teeth, said thread of said worm engaging some of the teeth of said rack, said worm providing a plurality of axial passages open at one end of said worm said plurality of axial passages being arranged in a circular arrangement around said longitudinal axis, a port plate engaging said one end of said worm and defining two arcuate ports curved about said longitudinal axis, one of said arcuate ports subtending substantially the same angle about said longitudinal axis as said teeth, said one arcuate port communicating with a source of high pressure lubricant, said other arcuate port subtending the major portion of the circle not subtended by said one arcuate port, said other arcuate port communicating with a source of low pressure lubricant, the radius of curvature of both said arcuate ports being such that the ends of said axial passages register with said arcuate ports, each of said axial passages communicating with a plurality of outlets in one flank of said thread.

7. A worm and rack mechanism comprising a worm having a thread, means mounting said worm for rotation about its own longitudinal axis, a rack formed with teeth, said thread engaging some of said teeth, a disc plate mounted on one end of said worm for rotation therewith, said worm defining a plurality of axial passages, each of said axial passages communicating with a plurality of outlets in one flank of said thread, and with a radial passage in said disc plate, a housing extending around the periphery of said disc plate, and fixed against rotation, said housing defining an arcuate recess subtending substantially the same angle about said longitudinal axis as said teeth and disposed so that the outer ends of said radial passages register with said arcuate recess successively as said worm is rotated, said arcuate recess communicating with a source of high pressure lubricant.

8. A worm and rack mechanism comprising a worm having a thread, means mounting said worm for rotation about its own longitudinal axis, a rack formed with teeth, said thread engaging some of said teeth, a disc plate mounted on one end of said worm for rotation therewith, said worm defining a plurality of axial passages, each of said axial passages communicating with a plurality of outlets in one flank of said thread, and with a radial passage in said disc plate, a housing extending around the periphery of said disc plate, and fixed against rotation, said housing defining two arcuate recesses, one of said arcuate recesses subtending substantially the same angle about said longitudinal axis as said teeth, said one arcuate recess communicating with a source of high pressure lubricant, the other arcuate recess subtending the major portion of the circle not subtended by said one arcuate recess and communicating with a source of low pressure lubricant.

References Cited

UNITED STATES PATENTS

| | | | |
|---|---|---|---|
| 1,176,936 | 3/1916 | Waldon | 74—467 X |
| 2,320,353 | 6/1943 | Ernst et al. | 74—467 X |
| 3,276,284 | 10/1966 | Rinck | 74—467 X |

FOREIGN PATENTS 914,165  12/1962  Great Britain.

DONLEY J. STOCKING, *Primary Examiner.*

L. H. GERIN, *Assistant Examiner.*